United States Patent
Koizumi et al.

(10) Patent No.: US 6,561,419 B1
(45) Date of Patent: May 13, 2003

(54) MAGNETIC CODE READING DEVICE AND MAGNETIC CODE READING METHOD

(75) Inventors: Yoshiyuki Koizumi, Isehara (JP);
Shingo Watanabe, Hiratsuka (JP);
Kazunori Matsumoto, Hujisawa (JP)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/427,649

(22) Filed: Oct. 27, 1999

(30) Foreign Application Priority Data

Nov. 13, 1998 (JP) ............................................. 10-323124

(51) Int. Cl.⁷ ................................................. G06K 7/08
(52) U.S. Cl. ......................................... 235/449; 360/51
(58) Field of Search .......................... 235/449, 61.11 E; 360/2, 51, 52

(56) References Cited

U.S. PATENT DOCUMENTS

| | | |
|---|---|---|
| 3,831,009 A | 8/1974 | McMillin |
| 3,914,789 A | 10/1975 | Coker, Jr. et al. |
| 4,040,097 A | 8/1977 | Mizuno |
| 4,599,510 A * | 7/1986 | Barth et al. ................. 235/449 |
| 5,274,218 A * | 12/1993 | Urata et al. ................. 235/384 |
| 5,616,904 A * | 4/1997 | Fernadez .................... 235/449 |
| 5,770,846 A * | 6/1998 | Mos et al. ................... 235/440 |

\* cited by examiner

Primary Examiner—Michael G. Lee
Assistant Examiner—Lisa M. Caputo
(74) Attorney, Agent, or Firm—Francis L. Conte (57) ABSTRACT

A magnetic code reading device and magnetic code reading method in an ATM or the like which after detecting a readout magnetic waveform including jitter, performs necessary transaction processing without performing uniform error processing in a predetermined case. The device includes a magnetic head having a magnetic sensor for writing and reading, magnetic code onto/from a magnetic recording medium, a timing disk for generating a timing pulse in correspondence with a moving distance of the magnetic head, and a controller for controlling the magnetic head and the timing disk, wherein upon reading of magnetic code on the magnetic recording medium where predetermined information is written in correspondence with the timing pulse, if jitter appears at relatively fixed intervals, corresponding to a rotational period of the timing disk, in a series of readout magnetic waveforms detected by the magnetic sensor, the controller recognizes the magnetic code based on the series of readout magnetic waveforms including the jitter, while if jitter is not related to the rotational period of the timing disk, the controller performs reading error processing.

27 Claims, 6 Drawing Sheets

FIG. 5

MAGNETIC CODE READING DEVICE AND MAGNETIC CODE READING METHOD

BACKGROUND OF THE INVENTION

1. Field of the Invention

The present invention relates to a magnetic code reading device and a magnetic code reading method for a magnetic recording medium such as a bankbook issued by a bank or the like or a credit card, and more particularly, to a device for reading magnetic code on a magnetic recording medium where predetermined information is written in correspondence with a timing pulse generated in correspondence with a moving distance of a magnetic head.

2. Description of Related Art

A bankbook of a bank or the like has a stripe-shaped magnetic recording medium for recording magnetic code, encoding the name of bank branch that issued the bankbook, an account number and the like, attached thereto. Further, in a magnetic card such as a credit card, a similar magnetic recording medium for recording magnetic code relating to a card number and the like is provided.

The bankbook or magnetic card is inserted into a bankbook slot or card slot in an automatic teller machine (hereinafter abbreviated to "ATM") or the like, then magnetic code recorded on the magnetic recording medium is read, and predetermined information is recognized.

As a method for recording magnetic code onto a magnetic recording medium, a digital recording method is employed, and various modulation methods are employed for modulating binary data in correspondence with existence/absence of magnetization, direction of magnetization or the like. Typical modulation methods are an NRZI (Non Return to Zero Inverted) method, an FM (Frequency Modulation) method, an MFM (Modified FM) method, (2, 7), (1, 7) coding methods and the like.

Among these modulation methods, the FM method and the coding methods enable self clocking by adding a clock signal to each bit indicative of writing code. In the FM method, for example, in a magnetic head transfer mechanism to move a magnetic head having a magnetic sensor on a surface of the stripe-shaped magnetic recording medium, a timing disk for generating a timing pulse in accordance with a moving distance of the magnetic head is provided, and the timing pulse is used as a clock signal, such that predetermined magnetic code is written onto the magnetic recording medium in synchronization with the rising edge (or falling edge) of the timing pulse.

The magnetic code written in this manner is detected by the magnetic sensor on the magnetic head moving at an almost constant speed on the surface of the magnetic recording medium by the magnetic head transfer mechanism. Then, a serial digital signal relating to the written predetermined information is reproduced based on a series of detected readout magnetic waveforms.

Figure 1:
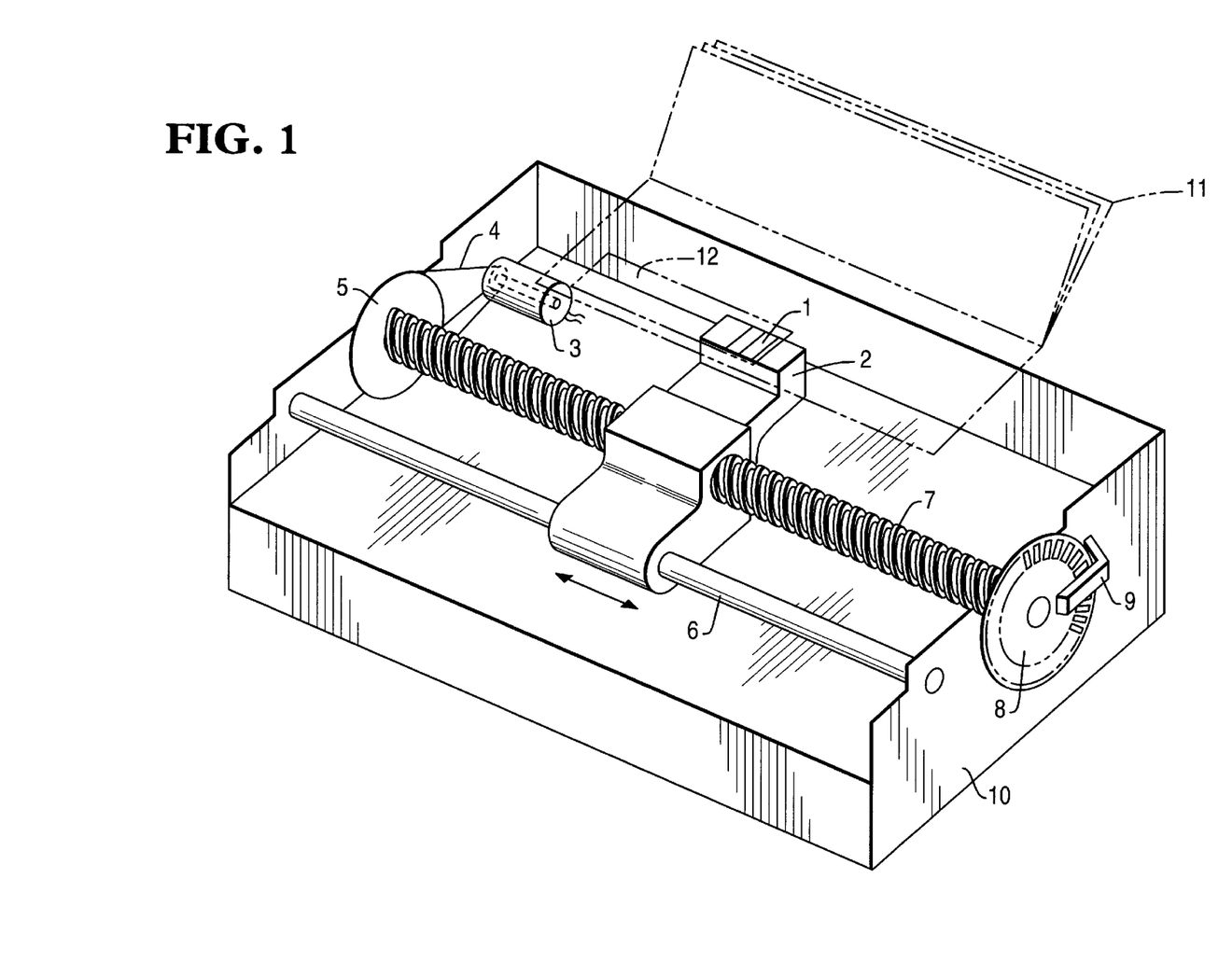
FIG. 1 is a diagram showing the mechanism in the magnetic code reading device.

In a magnetic head transfer mechanism as shown in FIG. 1, the timing disk, for generating the above-described timing pulse used in writing magnetic code, has a disk shape to rotate in accordance with rotation of a lead screw to move the magnetic head. The disk C has a plurality of slits at fixed intervals on its periphery. An optical detection sensor, comprising a light emitting device and a photoreception device, is attached to a frame of the magnetic head transfer mechanism such that the devices hold the periphery of the disk therebetween. In this manner, one timing pulse is generated by a unit moving distance of the magnetic head.

However, the ATM or the like is not always installed in a position in an excellent air environment. Further, as the ATM or the like contains a printer for printing the statement of each transaction such as obtaining cash on a rolled paper and cutting the printed paper, paper dust occurs within the cabinet.

The small particles and dust such as paper dust occasionally enter the slits of the timing disk, and prevent the optical detection sensor from precisely detecting the respective slits of the timing disk rotating with the movement of the magnetic head. Accordingly, the above-described timing pulse waveform used in writing magnetic code cannot be generated by the unit moving distance of the magnetic head, and a magnetic waveform written in this state includes a jitter waveform.

In a case where a written magnetic waveform including thus-occurred jitter is read, the waveform representing a binary bit is different from that representing a binary bit indicative of regular "1" or "0", and a "high" or "low" part extended for the timing clock unit period is detected.

In this case, a magnetic code reading device in a conventional ATM or the like determines that a writing error has occurred and performs uniform error processing. The device determines that the bankbook or magnetic card cannot be recognized and ejects it without performing necessary transaction processing.

By this operation, it is determined that the magnetic data must be written onto the bankbook or magnetic card again, and the bankbook or magnetic card cannot be used for such operation. Also, it is determined that correction must be performed on the ATM or the like, and it cannot be used.

BRIEF SUMMARY OF THE INVENTION

The present invention has been made in view of the fact that even though a readout magnetic waveform includes jitter, there is no problem in magnetic code reading and recognition processing in a predetermined case, and provides a magnetic code reading device comprising a magnetic head having a magnetic sensor for writing and reading magnetic code onto/from a magnetic recording medium, a timing disk for generating a timing pulse in correspondence with a moving distance of said magnetic head, and a controller for controlling said magnetic head and said timing pulse, wherein upon reading of magnetic code on the magnetic recording medium where predetermined information is written in correspondence with said timing pulse, if jitter appears at fixed intervals, corresponding to a rotational period of said timing disk, in a series of readout magnetic waveforms detected by said magnetic sensor, said controller recognizes said magnetic code based on said series of readout magnetic waveforms including the jitter, while if jitter not related to the rotational period of said timing disk appears, said controller performs reading error processing.

The controller has a storage buffer for temporarily storing a serial digital signal detected based on said series of readout magnetic waveforms detected by said magnetic sensor, and the controller detects the existence or absence of jitter repeated at relatively fixed intervals corresponding to the rotational period of said timing disk, in the serial digital signal.

Further, the present invention provides a method for reading magnetic code on a magnetic recording medium where predetermined information is written in correspondence with a timing pulse generated by a unit moving distance of a magnetic head having a magnetic sensor, comprising: a step of outputting a serial digital signal based on a series of readout magnetic waveforms detected by said magnetic sensor; a step of temporarily storing said serial digital signal into a storage buffer; a step of detecting existence or absence of jitter repeated at fixed intervals corresponding to a rotational period of a timing disk for generating said timing pulse, in said serial digital signal; and a step of, if said jitter appears repeated at relatively fixed intervals, correcting said jitter based on said serial digital signal including said jitter and recognizing said magnetic code, while if jitter appears asynchronous to the rotational period of said timing disk, performing reading error processing.

DETAILED DESCRIPTION

Hereinbelow, the details of magnetic code reading device and reading method according to the present invention will be described with reference to the drawings.

FIG. 1 shows an example of a mechanism in a magnetic code reading device used in the magnetic code reading device according to the present invention.

A bankbook 11, inserted into a bankbook slot of an ATM or the like, is transferred to a predetermined magnetic reading position for recognition of the bankbook 11 itself by internal transfer means (not shown). Generally, a stripe-shaped magnetic recording medium 12 for recording magnetic code encoding information indicative of the name of a bank branch issued the bankbook, an account number and the like, is attached to the rear side of the bankbook 11. The ATM or the like recognizes the bankbook 11 by writing necessary information onto the magnetic recording medium 12 and reading the written magnetic code later.

As shown in FIG. 1, in the magnetic code reading device such as the ATM, a magnetic head 2 having a magnetic sensor 1 writes and reads predetermined magnetic code while moving along the stripe-shaped magnetic recording medium 12 of the bankbook 11.

A DC motor capable of forward and reverse rotations is used as a motor 3. A transmission belt 4 for transmitting a rotational driving force is held on the rotation shaft of the motor 3. The transmission belt 4 transmits the rotational driving force of the motor 3 to a pulley 5. The pulley 5 is fixed to one end of a rotational shaft of a lead screw 7. The lead screw 7 has a helical groove as a male screw on its surface. The magnetic head has a helical groove as a female screw engaging with the lead screw 7. When the motor 3 rotates forward, for example, the magnetic head 2 horizontally moves rightward, and when the motor 3 rotates reversely, the magnetic head 2 horizontally moves leftward.

Further, the magnetic head 2 slides on a guide shaft 6 to stabilize its running.

A timing disk 8 is attached to the other end of the rotational shaft of the lead screw 7. The timing disk 8 has slits at fixed intervals in its periphery, and an optical sensor 9 is provided in a chassis 10 in a position to hold the periphery of the disk.

The optical sensor 9 comprises a light emitting device and a photoreception device. As light is transmitted through the portion of the slit of the timing disk 8 but is blocked at a portion where the slit is not formed, the optical sensor 9 outputs a timing pulse signal in correspondence with rotation of the timing disk 8 rotating with the lead screw.

Control means (not shown) detects the position of the magnetic sensor 1 based on the timing pulse outputted from the optical sensor 9, and writes predetermined magnetic code onto the magnetic recording medium 12 of the bankbook 11, using the timing pulse as a timing clock signal, in synchronization with the timing clock signal.

Figure 2A:
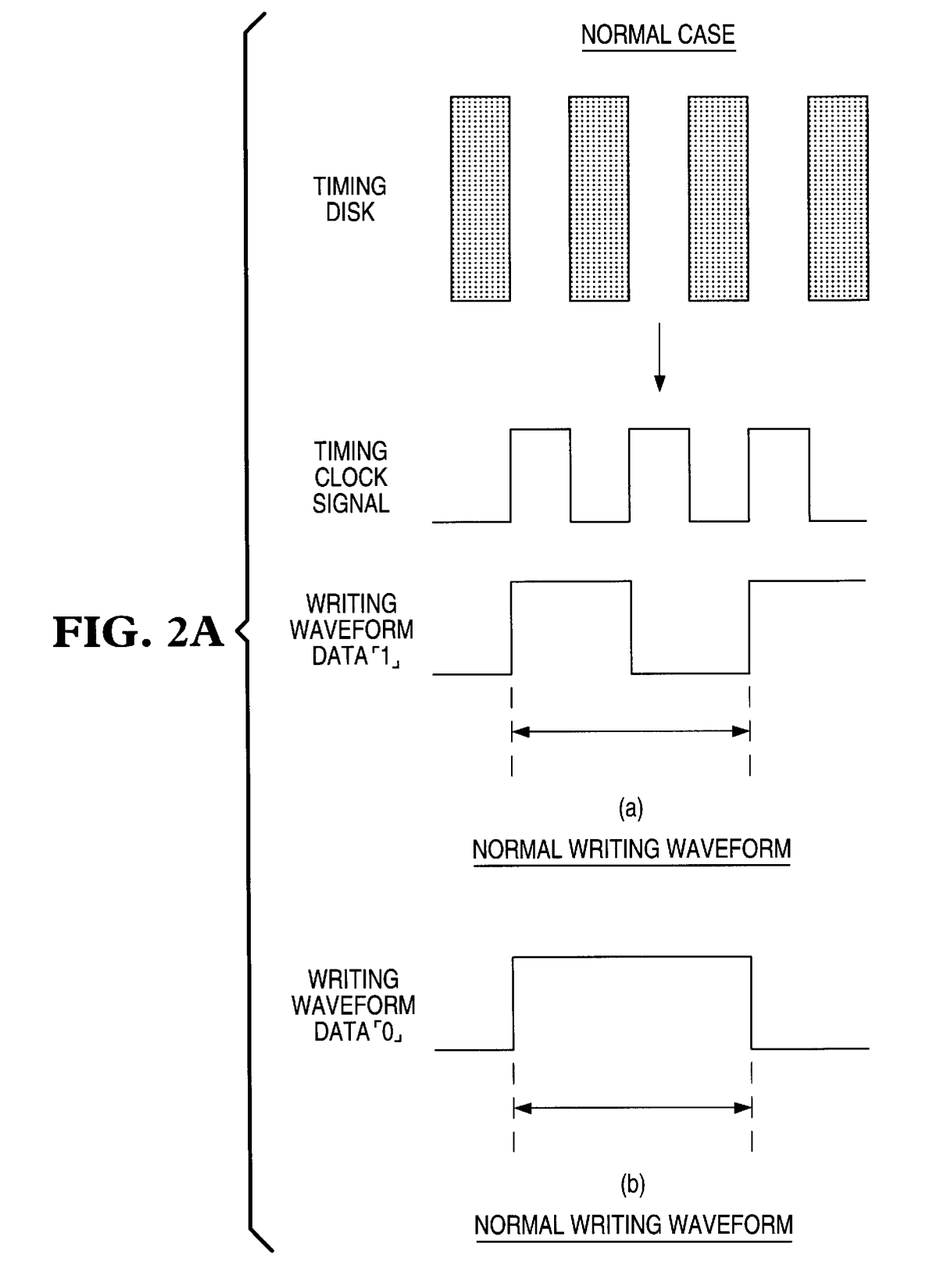
FIGS. 2A and 2B are diagrams showing examples of "normal waveform" and "jitter waveform" when magnetic code is written in synchronization with the timing clock signal.
Figure 2B:
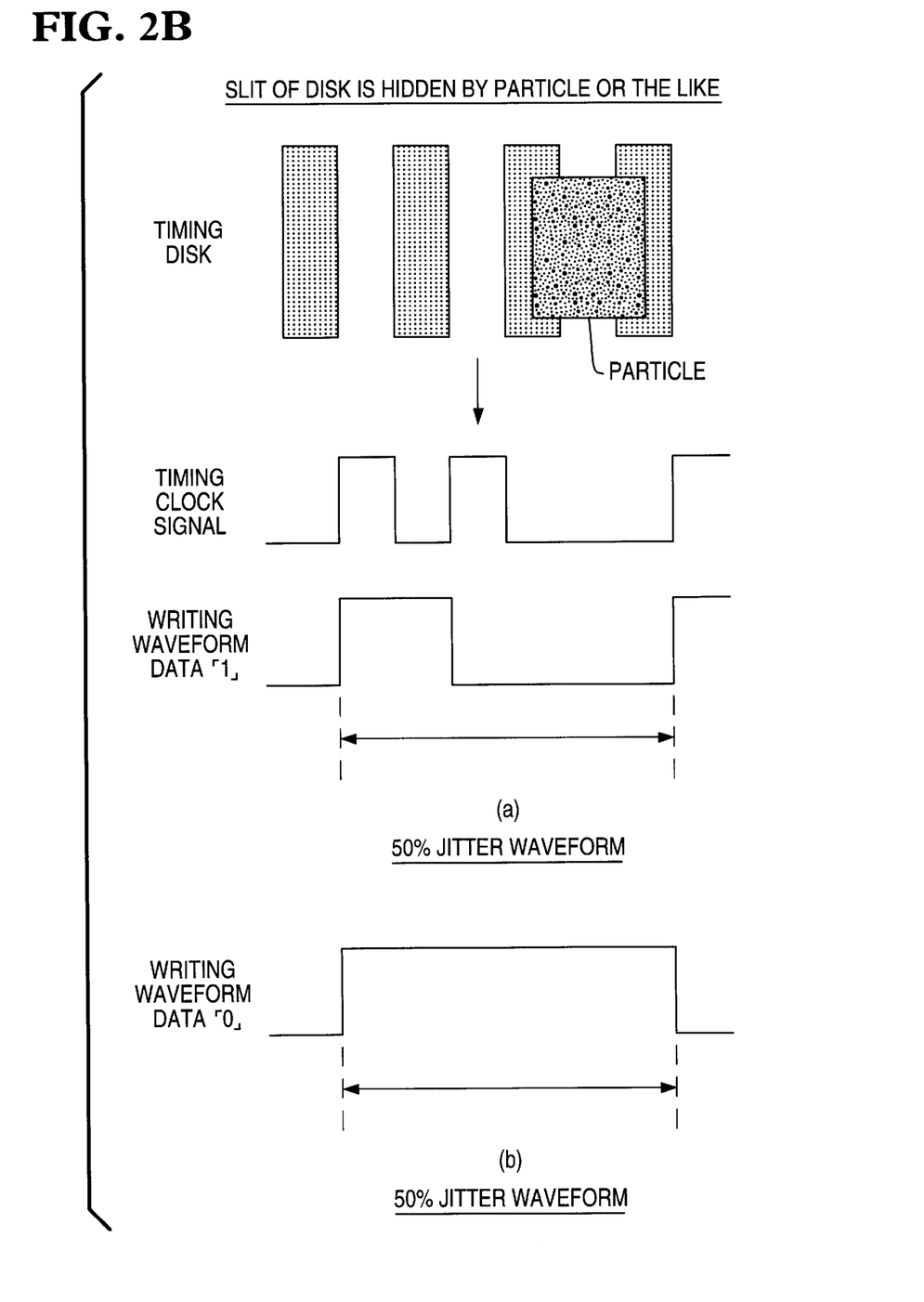

FIGS. 2A and 2B respectively show examples of "normal waveform" and "jitter waveform" when magnetic code is written in synchronization with the timing clock signal.

FIG. 2A shows a case of normal waveform. As described above, the timing clock signal is generated in accordance with the rotation of the timing disk 8 synchronized with the movement of the magnetic sensor 1. When predetermined magnetic code is written onto the magnetic recording medium 12 of the bankbook 11, in synchronization with the rising edge of the timing clock signal, the writing waveform of data "1" is as shown in FIG. 2A(a), and that of data "0" is as shown in FIG. 2A(b).

However, as shown in FIG. 2B, if a foreign particle is attached to the slit of the timing disk 8 and the slit blocks light from the light emitting device of the optical sensor 9, the "low" period of the timing clock signal is lengthened because the slit cannot be detected. In this status, if data "1" is written, the writing waveform of the data is as shown in FIG. 2B(a), and if data "0" is written, the writing waveform of the data is as shown in FIG. 2B(b). Accordingly, in this case, the waveforms in FIG. 2B(a) and FIG. 2B(b) are respectively 50% jitter waveforms with respect to the normal writing waveforms in FIG. 2A(a) and FIG. 2A(b).

The bankbook, in which the writing data including the jitter occurred as described above is written onto the magnetic recording medium 12, is read later. By movement control on the magnetic head by a mechanism similar to that described above (FIG. 1), the magnetic sensor 1 generates a series of analog electric signals by changes in magnetic amount (magnetic flux) recorded on the magnetic recording medium, while running on the magnetic recording medium at a predetermined speed.

Note that in the present embodiment, the magnetic code writing density in the magnetic recording medium 12 is 210 bits/inch, and the timing disk 8 has 82 slits. For example, if it is arranged such that data writing onto the magnetic recording medium is completed by rotations of the timing disk 8 six times, as 1 bit data is written for 2 pulses of the timing clock as shown in FIGS. 2A and 2B, about 246 bit data can be written onto the magnetic recording medium 12. Assuming that one character is represented by 4 bits, information of 60 or more characters can be written onto the magnetic recording medium 12.

A controller in the magnetic code reading device obtains a series of binary data by decoding the analog electric signals sensed by the magnetic sensor 1, and stores the data into a storage buffer for temporary storage.

Figure 3:
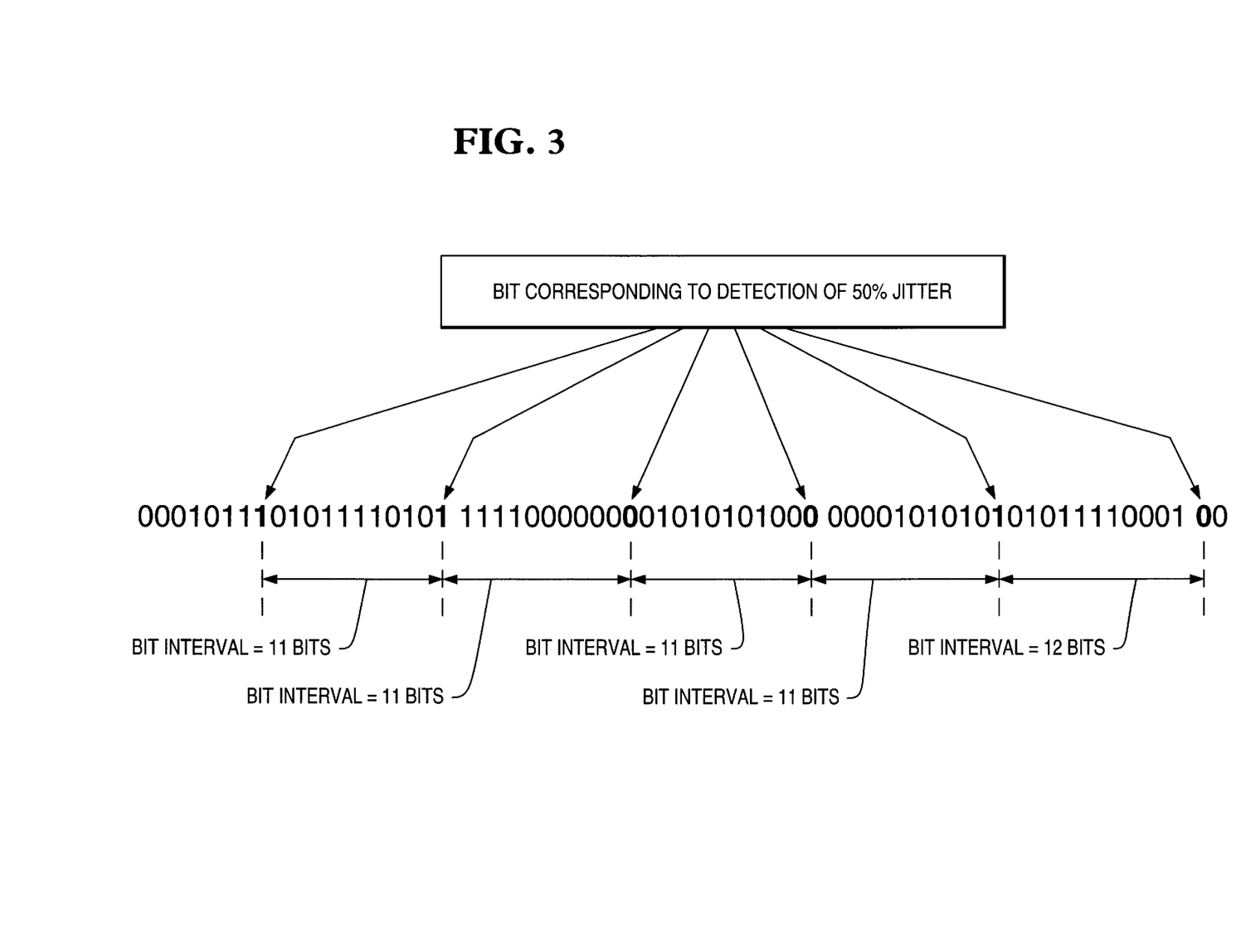
FIG. 3 is a diagram showing an example of the series of binary data relating to readout signals stored in the storage buffer.

FIG. 3 shows an example of the series of binary data stored in the storage buffer.

In the magnetic code reading method according to the present invention, the controller obtains such serial data by decoding the analog electric signals sensed by the magnetic sensor 1, and at the same time, stores the positions of occurrence of jitter waveform. Further, when binary decoding conversion on all the data has been completed, the controller calculates an average value of intervals of occurrence in the stored positions of occurrence of jitter waveform. Then, in consideration of a predetermined allowable range from the calculated average value of intervals of occurrence of jitter waveform, the controller determines whether or not all the jitter waveforms appear at intervals synchronized with the rotational period of the timing disk 8. If the controller determines that all the jitter waves appear at intervals synchronized with the rotational period of the timing disk 8, the controller performs reading processing, while if the controller determines that the jitter waves do not appear at intervals synchronized with the rotational period of the timing disk 8, the controller performs error processing to avoid the risk of misreading.

According to the example of FIG. 3, in a case where the positions of occurrence of the 50% jitter correspond to 8th bit, 19th bit, 30th bit, 41th bit, 52th bit and 64th bit of the serial binary signal stored in the storage buffer, the average value of all the jitter intervals is calculated as $\{(19-8)+(30-19)+(41-30)+(52-41)+(64-52)\}\div 5=11.2$ bits. Assuming that the allowable range is $(+1/-1)$ bits, as $10<11.2$ bits$<12$ holds, it can be regarded that the jitter occurred due to a foreign particle or the like attached to the slit of the timing disk 8. Then reading processing is performed. If the condition is not satisfied, to avoid the risk of misreading, reading error processing is performed.

Figure 4:
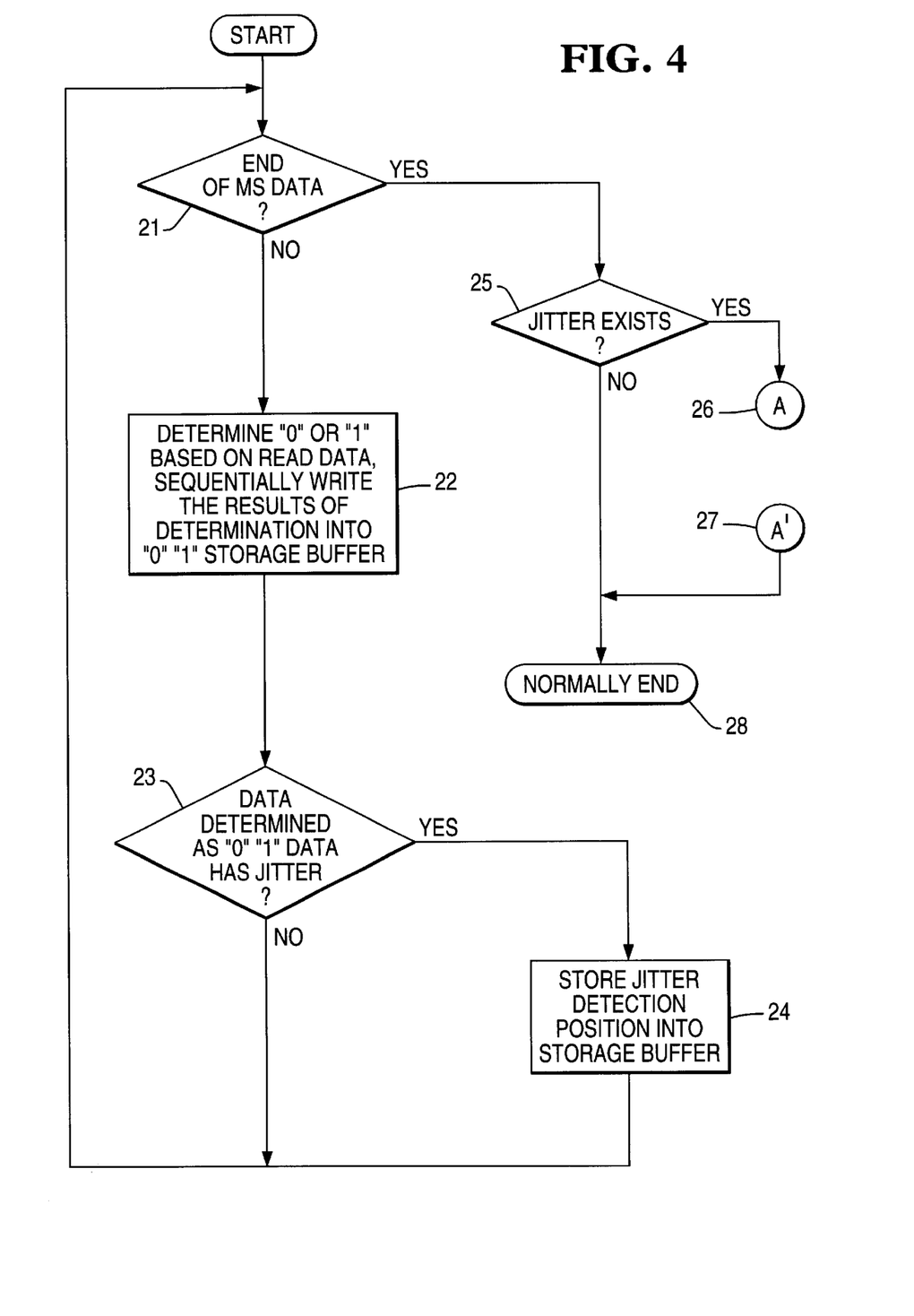
FIG. 4 is a flowchart showing an example of control flow in the magnetic code reading method according to the present invention.
Figure 5:
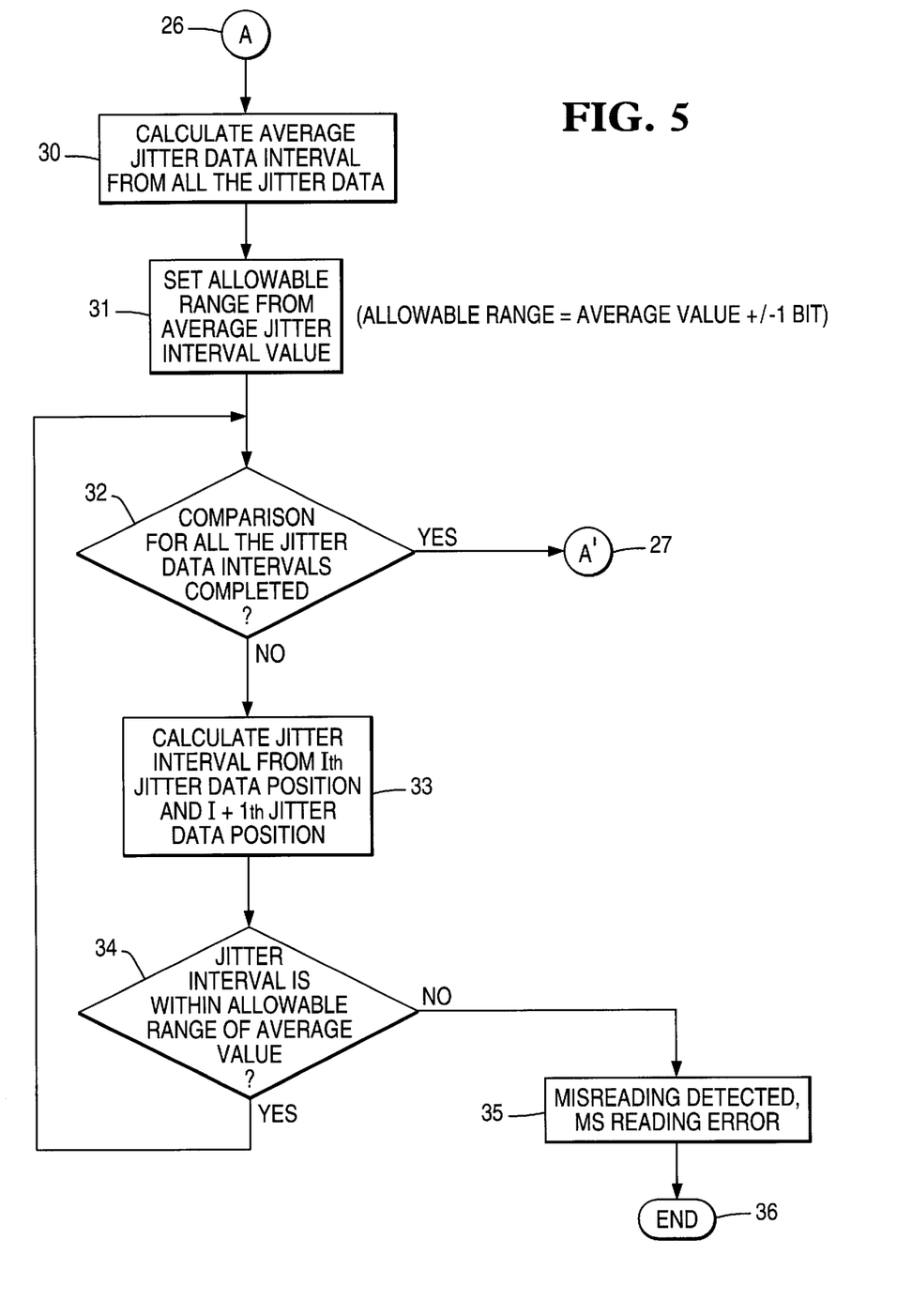
FIG. 5 is a flowchart showing an example of control flow in the magnetic code reading method according to the present invention.

FIGS. 4 and 5 show control flowcharts of the above-described magnetic code reading method according to the present invention.

When the magnetic sensor 1 has completed reading of the magnetic recording medium 12 in step 21, the controller determines binary "0" or "1" based on the read waveforms of the analog signals (decoding processing), and sequentially writes the series of binary data into the storage buffer in step 22. In the waveforms representing the respective binary data, if jitter (e.g., 50% jitter) is detected in step 23, the detection position of the jitter (bit position) is sequentially stored into a jitter storage buffer in the controller in step 24. If no jitter has been detected in step 25, reading processing is performed in step 28. When the detection positions of all the jitters have been stored into the jitter storage buffer in step 26, the average value of intervals of occurrence in the stored positions of occurrence of the jitter waveforms is calculated in step 30. Then, the predetermined allowable range is set from the calculated average value of intervals of occurrence of jitter waveforms in step 31. Then, all the jitter intervals are calculated by the method described in step 33. It is determined whether or not each jitter interval is within the allowable range in step 34. The determination is continued until the comparison for all the jitter intervals is completed in step 32. the analog signals (decoding processing), and sequentially writes the series of binary data into the storage buffer in step 22. In the waveforms representing the respective binary data, if jitter (e.g., 50% jitter) is detected, the detection position of the jitter (bit position) is sequentially stored into a jitter storage buffer in the controller in step 24. If no jitter has been detected, reading processing is performed in step 28. When the detection positions of all the jitters have been stored into the jitter storage buffer in step 26, the average value of intervals of occurrence in the stored positions of occurrence of the jitter waveforms is calculated in step 30. Then, the predetermined allowable range is set from the calculated average value of intervals of occurrence of jitter waveforms in step 31. Then, all the jitter intervals are calculated by the method described in step 33. It is determined whether or not each jitter interval is within the allowable range in step 34. The determination is continued until the comparison for all the jitter intervals is completed in step 32.

If all the jitter intervals are within the allowable range, the reading processing is performed in step 27, while if the intervals are outside the allowable range, the reading error processing in step 35 is performed, and the magnetic reading routine ends in step 36.

As described above, in the magnetic code reading device according to the present invention, in a serial digital signal, detected based on the series of readout magnetic waveforms detected by the magnetic sensor, if jitter repeated at fixed intervals corresponding to the rotational period of the timing disk is detected, magnetic code reading and recognition processing is performed, and necessary transaction processing can be performed without determining that the bankbook or magnetic card cannot be recognized and performing error processing.

What is claimed is:

1. A magnetic code reading device comprising a magnetic head having a magnetic sensor for writing magnetic code onto and reading magnetic code from a magnetic recording medium, a timing disk for generating a timing pulse in correspondence with a moving distance of said magnetic head, and a controller for controlling said magnetic head and said timing disk, wherein said controller determines, based on magnetic code including predetermined information recorded in correspondence with the timing pulse and read from the magnetic recording medium, if jitter appears in a series of readout magnetic waveforms detected by said magnetic sensor, and, wherein if jitter appears at relatively fixed intervals corresponding to a rotational period of said timing disk, said controller recognizes said magnetic code and if jitter does not appear at relatively fixed intervals corresponding to the rotational period of said timing disk, said controller performs reading error processing.

2. The magnetic code reading device according to claim 1, wherein said controller has a storage buffer for temporarily storing a serial digital signal based on said series of readout magnetic waveforms detected by said magnetic sensor and said controller detects existence of jitter repeated at relatively fixed intervals corresponding to the rotational period of said timing disk using said serial digital signal.

3. The magnetic code reading device according to claim 2, wherein said readout magnetic waveforms contain 50% or 100% of jitter with respect to normal waveforms.

4. The magnetic code reading device according to claim 2, wherein a modulation method for writing magnetic code onto said magnetic recording medium is FM modulation.

5. The magnetic code reading device according to claim 1, wherein said magnetic recording medium is a magnetic stripe recording medium provided on a bankbook.

6. A method for reading magnetic code on a magnetic recording medium where predetermined information is written in correspondence with a timing pulse generated by a unit moving distance of a magnetic head having a magnetic sensor, comprising:

outputting a serial digital signal based on a series of readout magnetic waveforms detected by the magnetic sensor;

storing said serial digital signal in a storage buffer;

detecting the existence or absence of jitter repeated at relatively fixed intervals corresponding to a rotational period of a timing disk for generating the timing pulse, in the serial digital signal;

if jitter is detected as being repeated at relatively fixed intervals, correcting the jitter based on the serial digital signal including the jitter and recognizing the magnetic code; and if jitter is detected as being asynchronous to the rotational period of said timing disk, performing reading error processing.

7. The magnetic code reading method according to claim 6, wherein said readout magnetic waveforms contain 50% or 100% of the jitter with respect to normal waveforms.

8. The magnetic code reading method according to claim 6, wherein a modulation method for writing magnetic code onto the magnetic recording medium is FM modulation.

9. An apparatus for reading a magnetic recording medium comprising:

means for writing magnetic code on said medium in synchronization with a periodic timing clock signal; and means for reading said magnetic code written on said medium notwithstanding erroneous synchronous jitter written into said code corresponding with said clock signal, and misreading said magnetic code for erroneous asynchronous jitter in said code.

10. An apparatus according to claim 9 wherein:

said writing means include a rotatable timing disk for generating said clock signal; and said reading means are configured for detecting said synchronous jitter as generated by said timing disk.

11. An apparatus according to claim 10 wherein said reading means are further configured for detecting said synchronous jitter corresponding with a rotational period of said timing disk.

12. An apparatus according to claim 11 wherein said writing means are further configured for writing said code longitudinally along said medium in synchronization with said clock signal generated by rotation of said timing disk.

13. An apparatus according to claim 12 wherein said reading means are further configured for:

initially reading said code on said medium as an analog signal, and then decoding said code in its entirety into a series of binary data;

determining positions in said data series of occurrences of jitter therein; and then determining whether said jitter is synchronous with said clock signal or asynchronous.

14. An apparatus according to claim 13 wherein said reading means are further configured for:

determining intervals of occurrence of said jitter in said data series; and determining whether or not said jitter intervals are synchronized with said rotational period of said timing disk to determine said synchronous jitter.

15. An apparatus according to claim 13 wherein said reading means are further configured for:

calculating an average value of said jitter intervals in said data series; and comparing said average value with an allowable range of said jitter intervals to determine synchronous jitter within said allowable range, and asynchronous jitter outside said allowable range.

16. An apparatus according to claim 13 wherein said reading means are further configured for:

calculating an average value of said jitter intervals in said data series;

setting an allowable range around said average value; and determining whether or not each jitter interval is within said allowable range to determine synchronous jitter within said allowable range, and asynchronous jitter outside said allowable range.

17. An apparatus according to claim 12 wherein said reading and writing means comprise a common magnetic head having a magnetic sensor for both writing code to said medium and reading said code therefrom.

18. An apparatus according to claim 17 wherein said reading and writing means further comprise in common:

a lead screw for translating said head longitudinally along said medium, with said timing disk being attached to one end of said screw for rotation therewith; and a motor operatively joined to said screw for rotation thereof in opposite rotary directions.

19. An apparatus according to claim 18 wherein said timing disk has a series of slits around the periphery thereof cooperating with an optical sensor for generating said clock signal upon rotation of said disk.

20. An apparatus according to claim 19 wherein said reading means are further configured for detecting said synchronous jitter generated by a foreign particle blocking one of said slits in said timing disk.

21. An apparatus according to claim 20 wherein said reading means are further configured for reading said magnetic code notwithstanding at least about 50% synchronous jitter therein caused by said foreign particle blocking one of said slits in a data bit corresponding with two sequential slits of said disk.

22. A device for reading magnetic code from a magnetic reading medium comprising:

a magnetic head configured for writing magnetic code on said medium and reading said code therefrom;

means for moving said head over said medium;

a timing disk operatively joined to said moving means in cooperation with an optical sensor for generating a periodic timing clock signal to synchronize writing of said code on said medium; and a controller operatively joined to said magnetic head and configured for decoding said magnetic code notwithstanding erroneous jitter written into said code in synchronization with said clock signal.

23. A device according to claim 22 wherein said timing disk has a series of slits around the periphery thereof cooperating with said optical sensor for generating said clock signal upon rotation of said disk.

24. A device according to claim 23 wherein said controller is further configured for detecting said synchronous jitter generated by a foreign particle blocking one of said slits in said timing disk.

25. A device according to claim 24 wherein said controller is further configured for detecting said synchronous jitter corresponding with a rotational period of said timing disk.

26. A device according to claim 25 wherein said controller is further configured for:

initially reading said code on said medium as an analog signal, and then decoding said code in its entirety into a series of binary data;

determining positions in said data series of occurrences of jitter therein; and then determining whether said jitter is synchronous with said clock signal or asynchronous.

27. A device according to claim 26 wherein said controller is further configured for:

determining intervals of occurrence of said jitter in said data series; and determining whether or not said jitter intervals are synchronized with said rotational period of said timing disk to determine said synchronous jitter.

* * * * *